United States Patent
Brutaru

(10) Patent No.: US 10,464,790 B1
(45) Date of Patent: Nov. 5, 2019

(54) FIBER PULLING WINCH ATTACHMENT FOR AN EXCAVATOR BUCKET

(71) Applicant: Viorel Gabriel Brutaru, Boca Raton, FL (US)

(72) Inventor: Viorel Gabriel Brutaru, Boca Raton, FL (US)

( * ) Notice: Subject to any disclaimer, the term of this patent is extended or adjusted under 35 U.S.C. 154(b) by 0 days.

(21) Appl. No.: 16/207,112

(22) Filed: Dec. 1, 2018

(51) Int. Cl.
| | |
|---|---|
| *E02F 5/10* | (2006.01) |
| *H02G 1/06* | (2006.01) |
| *B66D 1/60* | (2006.01) |
| *B66D 1/08* | (2006.01) |
| *G02B 6/44* | (2006.01) |
| *E02F 3/96* | (2006.01) |

(52) U.S. Cl.
CPC .................. *B66D 1/60* (2013.01); *B66D 1/08* (2013.01); *E02F 3/964* (2013.01); *E02F 5/10* (2013.01); *G02B 6/4439* (2013.01); *H02G 1/06* (2013.01)

(58) Field of Classification Search
CPC .............. E02F 5/10; E02F 5/025; H02G 1/06
USPC ............................................. 405/183.5, 184
See application file for complete search history.

(56) References Cited

U.S. PATENT DOCUMENTS

| | | | | | |
|---|---|---|---|---|---|
| 3,874,532 | A | * | 4/1975 | Metailler | B66C 23/36 37/403 |
| 5,211,509 | A | * | 5/1993 | Roessler | F16L 1/065 254/29 R |
| 5,626,442 | A | * | 5/1997 | Boyer | B08B 9/0436 134/22.1 |
| 5,672,029 | A | * | 9/1997 | Boyer | B08B 9/0436 138/97 |
| 5,913,639 | A | * | 6/1999 | Ellis | H02G 1/08 242/557 |
| 6,152,425 | A | * | 11/2000 | Boyer | B66C 23/66 212/232 |
| 6,405,460 | B1 | * | 6/2002 | Whitmire | B66F 9/12 37/405 |
| 6,494,437 | B1 | * | 12/2002 | Boyer | B08B 9/0436 212/232 |
| 2003/0014887 | A1 | * | 1/2003 | Martinez | B66D 1/00 37/397 |

* cited by examiner

*Primary Examiner* — Frederick L Lagman
(74) *Attorney, Agent, or Firm* — Ruben Alcoba, Esq.

(57) ABSTRACT

An improved fiber cable pulling winch attachment for an excavator. The winch attachment has a pair of bucket mounts that are attached to an excavator's bucket. A Y-shaped mount that is mounted on the bucket mounts. A hydraulic motor and spool attachment that is inserted within the Y-shaped mount. And a hydraulic motor and spool that are secured on the hydraulic motor and spool attachment, wherein the spool and the hydraulic motor are operatively connected to each other.

4 Claims, 4 Drawing Sheets

FIBER PULLING WINCH ATTACHMENT FOR AN EXCAVATOR BUCKET

BACKGROUND

The present invention is directed to an improved fiber cable pulling winch attachment for an excavator bucket.

In the art of pulling fiber optic cable from existing pipe conduits, there are devices that are designed to pull cable from pipe conduits.

Devices that are designed to pull cable are described in U.S. Pat. No. 5,913,639, issued to George g. Ellis on Jun. 22, 1999, titled Mechanized Cable Puller. The 639 patent describes an attachment that attaches to the lateral sides of a scoop of a backhoe or excavator via one central attachment point that is disposed on a lateral side of scoop.

The present invention is designed to attach to a scoop of an excavator at a position that is positioned outward of the scoop's attachment means that connects to the arm of an excavator. The positioning of the winch attachment of the present invention is the key to this invention, for it allows the winch attachment's bucket mounts to remain on the bucket of the excavator when not using the hydraulic motor or spool attachments of the present invention.

In the prior art, when using the scoop of the excavator, the prior mount attachment means would have to be removed to use the scoop without damaging the mount attachments. The manner of attaching the mounts in the present invention and the ease of connecting the motor and spool attachment is what distinguishes the present invention from the 639 patent.

For the foregoing reason there is a need for an improved fiber cable pulling winch attachment for an excavator bucket that will allow the bucket mounts to remain on the excavator's scoop when not using the hydraulic motor and spool attachments to pull fiber cable from a conduit.

SUMMARY

The present invention describes an improved fiber cable pulling winch attachment for an excavator bucket.

The attachment has a pair of bucket mounts that are attached to an excavator's bucket. A Y-shaped mount that is mounted on the bucket mounts. A hydraulic motor and spool attachment that is inserted within the Y-shaped mount. And a hydraulic motor and spool that are secured on the hydraulic motor and spool attachment, wherein the spool and the hydraulic motor are operatively connected to each other.

The bucket mounts are welded to the scoop of an excavator.

The attachment is used by first mounting the Y-shaped mount over the bucket mounts and then securing the Y-shaped mount on the bucket mounts with pins. Then, inserting and securing the hydraulic motor and spool attachment on the Y-shaped mount.

The hydraulic motor and spool attachment mount, ideally will have the hydraulic motor and spool secured to it prior to insertion into the Y-shaped mount, for efficient use. Yet, the hydraulic motor and spool can be attached to the hydraulic motor and spool attachment after it is inserted within the Y-shaped mount.

An object of the present invention is to provide an improved fiber cable pulling winch attachment for an excavator bucket that will allow the bucket mounts to remain on the excavator's bucket when not using the hydraulic motor and spool attachments to pull fiber cable from a conduit.

Another object of the present invention is to provide a fiber cable pulling winch attachment for an excavator bucket wherein the spool of the device will be linearly lined up with the arm of an excavator, thereby maintaining a center of gravity that will correspond to the center of gravity of the bucket that is attached to the excavator's am.

DRAWINGS

These and other features, aspects, and advantages of the present invention will become better understood with regards to the following description, appended claims, and drawings where:

DESCRIPTION

Figure 1:
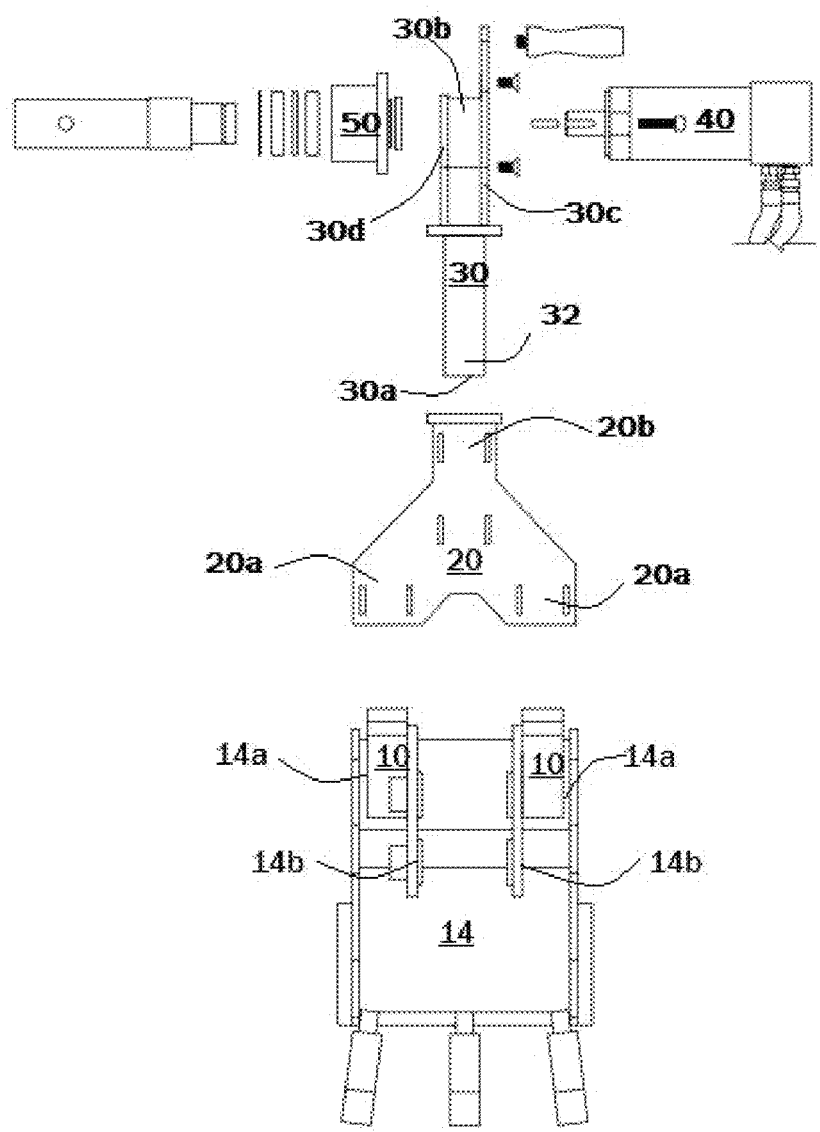
FIG. 1 is a top plan view of the present invention.
Figure 2:
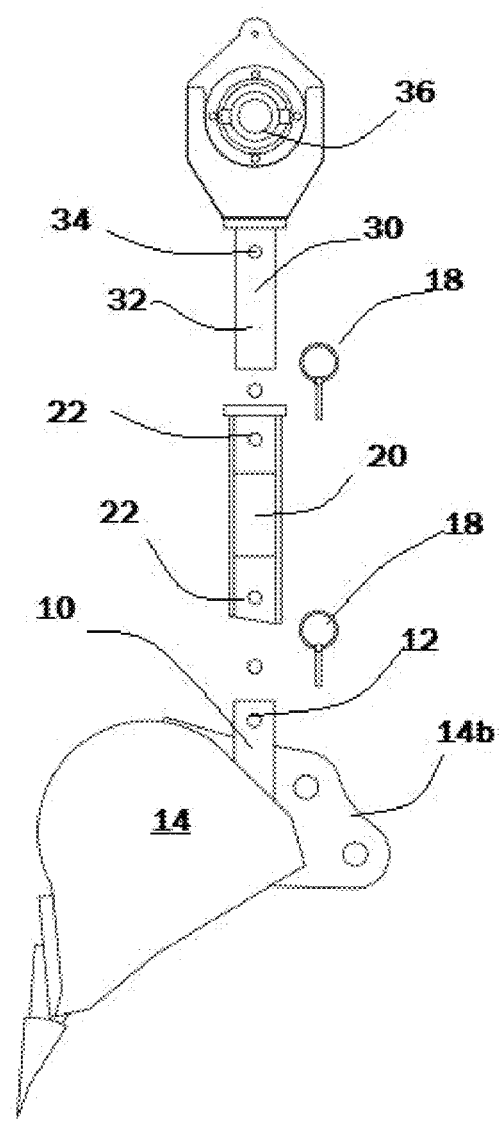
FIG. 2 is a side view showing how the present invention is attached and connected.
Figure 3:
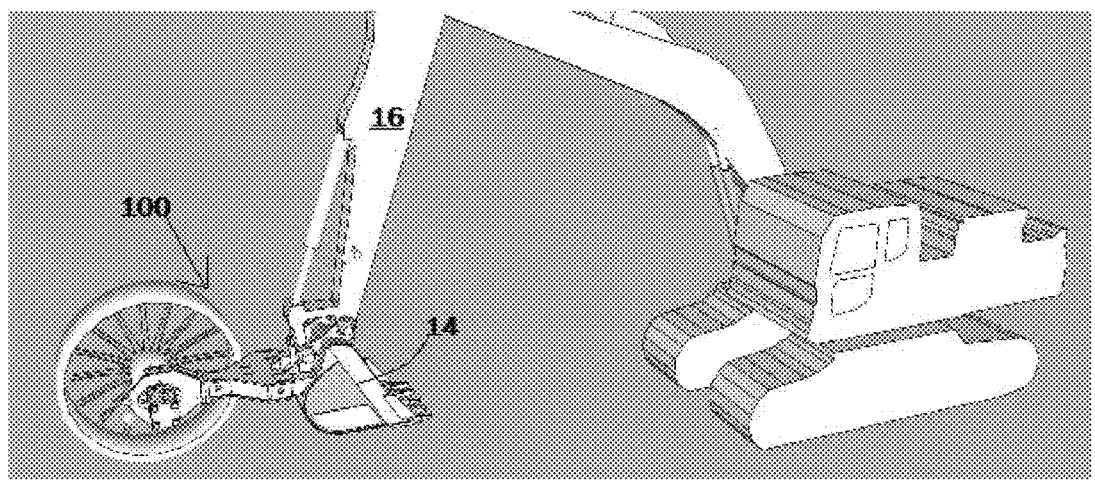
FIG. 3 is a perspective view that shows the present invention on an excavator.
Figure 4:
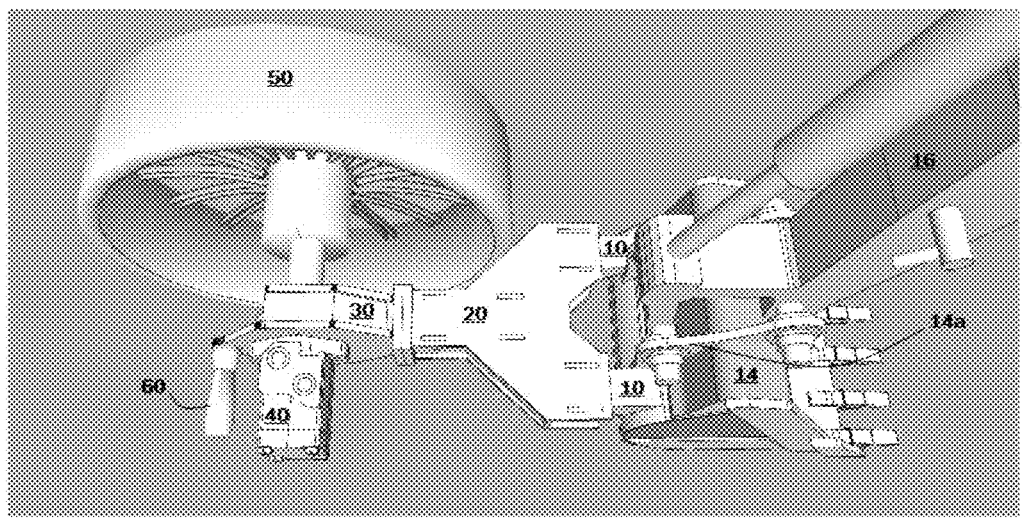
FIG. 4 is a perspective top view that shows the present invention on the scoop of the excavator.
Figure 5:
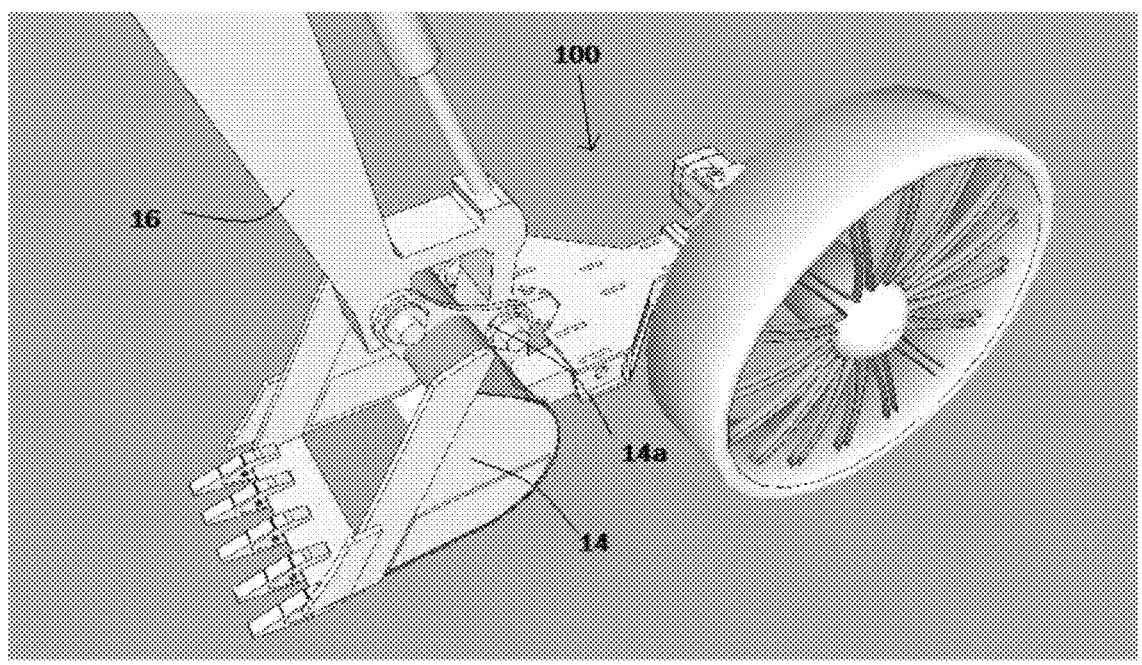
FIG. 5 is a perspective view that shows the present invention on the scoop of the excavator.

As seen in FIGS. 1-5, the present invention describes an improved fiber cable pulling winch attachment 100 for an excavator bucket. The attachment 100 comprises a pair of bucket mounts 10 that define at least one through hole 12, each bucket mount 10 is welded to an excavator's bucket 14 at positions 14a that are outward of the excavator's bucket's attachment member; 14b that attach to an excavator's arm 16. A plurality of pins 18 are used to connect elements of the present invention. A Y-shaped mount 20 that defines through holes 22 on each extremity of the mount, the Y-shaped mount defines two parallel extremities 20a that are hollow and a central extremity 20b that is hollow and that is centered between the two parallel extremities 20a and that runs in an opposite direction from the two parallel extremities 20a, the two parallel extremities 20a are mounted on the bucket mounts 10 and are secured to the bucket mounts via pins 18 that are placed through the through holes of the bucket mounts 12 and the two parallel extremities 20a of the Y-shaped mount 20. A hydraulic motor and spool attachment 30 that has a first 30a and a second end 30b, the first end 30a defines a shaft 32 that defines through holes 34 that inserts within the central extremity 20b of the Y-shaped mount 20 and is secured to the Y-shaped mount 20 via at least one pin 18, the second end 30b defines a central cavity 36. A hydraulic motor 40 that is secured to a first side 30c of the second end 30b of the hydraulic motor and spool attachment 30. A spool 50 that is attached to a second side 30d of the second end 30b of the hydraulic motor and spool attachment 30, the spool 50 and the hydraulic motor 40 are operatively connected to each other. And, a handle 60 that is attached to the second end 30b of the hydraulic motor and spool attachment 30.

The bucket mounts 10, the Y-shaped mount 20, and the hydraulic motor and spool attachment 30 are all made of either a metal, an iron or a steel material.

An advantage of the present invention is that it provides an improved fiber cable pulling winch attachment for an excavator bucket that allows the bucket mounts to remain on the excavator's bucket when not using the hydraulic motor and spool attachments to pull fiber cable from a conduit.

Another advantage of the present invention is that it provides an improved fiber cable pulling winch attachment for an excavator bucket wherein the spool of the device linearly lines up with the arm of an excavator, thereby maintaining a center of gravity that corresponds to the center of gravity of the bucket that is attached to the excavator's arm.

While the inventor's above description contains many specificities, these should not be construed as limitations on the scope, but rather as an exemplification of several preferred embodiments thereof. Accordingly, the scope should not be determined by the embodiments illustrated, but by the appended claims and their legal equivalents.

What is claimed is:

1. An improved fiber cable pulling winch attachment for an excavator bucket, the attachment comprises:
    a pair of bucket mounts that define at least one through hole, each bucket mount is welded to an excavator's bucket at positions that are outward of the excavator's bucket's attachment member; that attach to an excavator's arm;
    a plurality of pins;
    a Y-shaped mount that defines through holes on each extremity of the Y-shaped mount, the Y-shaped mount defines two parallel extremities that are hollow and a central extremity that is hollow and that is centered between the two parallel extremities and that runs in an opposite direction from the two parallel extremities, the two parallel extremities are mounted on the bucket mounts and are secured to the bucket mounts via pins that are placed through the at least one through hole of the bucket mounts and the two parallel extremities of the Y-shaped mount;
    a hydraulic motor and spool attachment that has a first and a second end, the first end defines a shaft that defines through holes that inserts within the central extremity of the Y-shaped mount and is secured to the Y-shaped mount via at least one pin, the second end defines a central cavity;
    a hydraulic motor that is secured to a first side of the second end of the hydraulic motor and spool attachment; and
    a spool that is attached to a second side of the second end of the hydraulic motor and spool attachment, the spool and the hydraulic motor are operatively connected to each other.

2. The improved fiber cable pulling winch attachment for an excavator bucket of claim 1, the attachment comprises a handle that is attached to the second end of the hydraulic motor and spool attachment.

3. The improved fiber cable pulling winch attachment for an excavator bucket of claim 2, wherein the bucket mount, the Y-shaped mount and the hydraulic motor and spool attachment are all made of either a metal, an iron or a steel material.

4. The improved fiber cable pulling winch attachment for an excavator bucket of claim 1, wherein the bucket mount, the Y-shaped mount and the hydraulic motor and spool attachment are all made of either a metal, an iron or a steel material.

* * * * *